US008408708B2

(12) United States Patent
Sharp

(10) Patent No.: US 8,408,708 B2
(45) Date of Patent: Apr. 2, 2013

(54) POLARIZATION MODULATION WHEEL

(75) Inventor: Gary D. Sharp, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 135 days.

(21) Appl. No.: 12/785,351

(22) Filed: May 21, 2010

(65) Prior Publication Data
US 2010/0296059 A1 Nov. 25, 2010

Related U.S. Application Data

(60) Provisional application No. 61/180,577, filed on May 22, 2009.

(51) Int. Cl.
*G03B 21/00* (2006.01)

(52) U.S. Cl. ............... 353/7; 353/8; 353/20; 353/30; 353/31; 353/84; 353/122; 349/9; 359/465

(58) Field of Classification Search ............ 353/7, 8, 353/20, 30, 31, 84, 122; 349/5, 7, 8, 9, 97, 349/106, 108, 109; 359/887, 891, 589, 884, 359/890, 464, 465; 348/743, 742, 744–745, 348/268, 269, 270, 274
See application file for complete search history.

(56) References Cited

U.S. PATENT DOCUMENTS

| | | | | |
|---|---|---|---|---|
| 5,921,650 | A * | 7/1999 | Doany et al. ............... | 353/31 |
| 6,943,955 | B2 * | 9/2005 | Kaschke et al. ............ | 359/630 |
| 7,033,027 | B2 * | 4/2006 | Maximus ................. | 353/31 |
| 7,195,356 | B1 * | 3/2007 | Sharp ...................... | 353/20 |
| 2003/0112507 | A1 * | 6/2003 | Divelbiss et al. .......... | 359/464 |
| 2004/0150889 | A1 * | 8/2004 | McDonald ................ | 359/634 |
| 2005/0041163 | A1 * | 2/2005 | Butler-Smith et al. ...... | 348/744 |
| 2005/0237487 | A1 * | 10/2005 | Chang .................... | 353/7 |
| 2006/0038964 | A1 | 2/2006 | Lu | |
| 2007/0139618 | A1 | 6/2007 | Decusatis et al. | |
| 2008/0239068 | A1 | 10/2008 | Lipton | |
| 2009/0073389 | A1 | 3/2009 | Dobler | |
| 2009/0079941 | A1 * | 3/2009 | Miller et al. ............. | 353/8 |
| 2009/0190210 | A1 | 7/2009 | Coleman et al. | |
| 2009/0213330 | A1 * | 8/2009 | Silverstein et al. ........ | 353/8 |

FOREIGN PATENT DOCUMENTS

| | | |
|---|---|---|
| DE | 4125241 A1 | 1/1993 |
| JP | 2001174750 A | 6/2001 |
| WO | 2008123943 A1 | 10/2008 |

OTHER PUBLICATIONS

Robinson et al., "Polarization Engineering for LCD Projection," Ch. 6, Wiley & Sons (2004).
International search report and written opinion of the international searching authority in co-pending PCT/US10/35859 dated Jan. 10, 2011.
Hariharan et al. "Achromatic retarders using quartz and mica," Measurement Science and Technology, IP, vol. 6, No. 7, XP020065992, ISSN 0957-0233 (Jul. 1, 1995).

* cited by examiner

*Primary Examiner* — Georgia Y Epps
*Assistant Examiner* — Sultan Chowdhury
(74) *Attorney, Agent, or Firm* — Baker & McKenzie LLP

(57) ABSTRACT

A polarization switch provides substantially ideal binary polarization switching over a broad range of wavelengths using a polarization modulation wheel having at least one retarder stack that transforms polarization. Using the polarization modulation wheel in a polarization system provides a high throughput polarization switch and operates over a wide range of incidence angles while providing substantially continuous and smooth polarization output for each component for any selected polarization basis set. The polarization modulation wheel is well-suited for stereoscopic polarized projection applications.

26 Claims, 13 Drawing Sheets

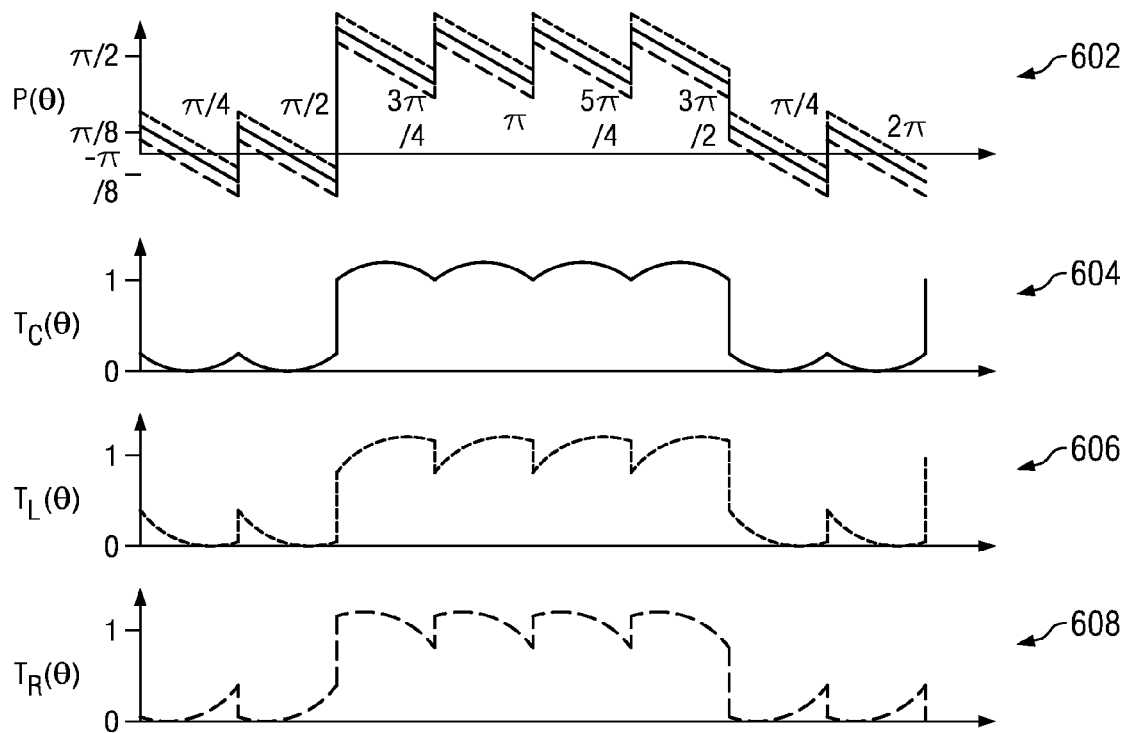

FIG. 6

| Parameter | Value |
|---|---|
| Wheel clear aperture radius | 175 mm |
| Height of light patch (H) | 50 mm |
| Width of light patch (L/2) | 50 mm |
| Number of Segments per field | 6 |
| Duty Cycle | 74% |
| Base polarizer polarizing efficiency | 100% (ideal*) |
| Linear Polarizer System: Center Contrast Ratio (max) | 43:1 |
| Linear Polarizer System: Corner Contrast Ratio (max) | 5:1 |
| Base CP (zero-order PC QW on above linear polarizer) | QW at 516 nm |
| G | 26 |
| Circular Polarizer System: Center Contrast Ratio (max) | 1,118:1* |
| Circular Polarizer System: Corner Contrast Ratio (max) | 130:1* |

FIG. 8

| LAYER NUMBER | ORIENTATION |
|---|---|
| 1 | -19.6° |
| 2 | 2.4° |
| 3 | 18.1° |
| 4 | -65.6° |
| 5 | -54.3° |
| 6 | -15.0° |
| 7 | 15.0° |
| 8 | 54.3° |
| 9 | 65.6° |
| 10 | -18.1° |
| 11 | -2.4° |
| 12 | 19.6° |

1300

| LAYER NUMBER | ORIENTATION |
|---|---|
| 1 | 5.4° |
| 2 | 21.5° |
| 3 | 38.5° |
| 4 | -38.5° |
| 5 | -21.5° |
| 6 | -5.4° |

| LAYER NUMBER | STACK 1 ORIENTATION | STACK 2 ORIENTATION |
|---|---|---|
| 1 | 2.0° | -2.0° |
| 2 | 9.3° | -9.3° |
| 3 | 18.5° | -18.5° |
| 4 | -63.5° | 63.5° |
| 5 | -54.3° | 54.3° |
| 6 | -47.0° | 47.0° |

*FIG. 15*

POLARIZATION MODULATION WHEEL

CROSS-REFERENCE TO RELATED APPLICATIONS

This patent application relates and claims priority to provisional patent application 61/180,577, entitled "Polarization modulator wheel for stereoscopic projection systems," filed May 22, 2009, which is herein incorporated by reference for all purposes.

BACKGROUND

1. Technical Field

This disclosure generally relates to binary polarization modulators and, more specifically, relates to the application of binary polarization modulators to time sequential stereoscopic projection systems.

2. Background

Time sequential stereoscopic projection systems alternately present full-frame left and right perspective imagery to the appropriate eye. As such, they use the synchronous operation of a projector with some form of shuttering mechanism. Among the benefits, this approach enables single-projector 3D display, which automatically provides accurate registration of the two images. The elements of the shuttering system may not all reside at the viewer, but some form of analyzer should be used at the viewer to discriminate between the encoded images. In polarization based systems, the simplest approach places orthogonal polarization analyzers at the viewer, with the other elements of the shutter residing at the projector. Typically, the latter includes an input polarizer, and some form of active polarization switch. This has the benefit of minimizing the cost and complexity, since only a single copy is used for elements upstream of the analyzer. However, it places stringent demands on the polarization dependence of any additional elements placed within the shutter (e.g. the screen).

An exemplary display technology is capable of delivering very fast switching (e.g., <100 μs), such that there is complete temporal separation of images. In many instances, there is a further preference for auxiliary shuttering that accommodates the finite switching time of the 3D shuttering means, thereby reducing cross-talk (partial transmission of the wrong image). Such is the case with digital light processing (DLP) projection systems, which for instance, allow liquid crystal (LC) polarization switching transitions to be hidden by high-speed, high dynamic range, shuttering of the display. In principle, the encoding means may be any technology that makes it possible to deliver the appropriate image to each eye. This can include any pair of non-overlapping spectra, any set of orthogonal polarizations, and even angle or position. At present, polarization based systems are most common in the digital cinema.

The most common polarization switches utilize high-speed LC modes. While such devices are used in a high percentage of 3D digital cinema platforms, they do have some performance deficiencies. In particular, high contrast is difficult to maintain for systems operating at low throw-ratios (such as those in home/office environments). Also, LC device operation is most convenient with circular polarization, but there are instances where linear polarizers are preferred (e.g. markets with extreme eyewear price sensitivity, or situations where linear polarizer eyewear is already prevalent, such as theme parks). In addition, current systems typically suffer some on-state efficiency loss due to the chromatic nature of the retarder films used in circular polarization based systems.

BRIEF SUMMARY

A polarization modulator is disclosed. According to an aspect, the polarization modulator is operable to temporally modulate incoming linearly polarized light on a light path. According to another aspect, the polarization modulator has a polarization wheel located on the linearly polarized light path. The polarization wheel may have a first circular arc and a second circular arc, at least one of which comprises a retarder stack filter. According to another aspect, the first and second circular arcs both comprise a retarder stack filter.

According to another aspect, a stereoscopic projection system is also disclosed. According to this aspect, the stereoscopic projection system has a projector subsystem and a polarization modulation subsystem. The polarization modulator subsystem may temporally modulate projected images from the projector subsystem into orthogonal polarization states. The polarization modulator subsystem has a polarization wheel with a first circular arc and a second circular arc. The first and second circular arcs both comprise retarder stack filters.

BRIEF DESCRIPTION OF THE DRAWINGS

Embodiments are illustrated by way of example in the accompanying figures, in which like reference numbers indicate similar parts, and in which:

FIG. 6 is a timing diagram illustrating duty cycles of a conventional polarizer wheel;

FIG. 8 is a table showing characteristic values for a commercially available stereoscopic 3D segmented polarizer wheel system;

FIG. 13 is a table showing a six-layer pure achromatic rotator, in accordance with the present disclosure;

FIG. 15 is a table of a solution, in accordance with the present disclosure;

DETAILED DESCRIPTION

An alternative to an LC polarization switch is to employ electromechanical switching means for generating a stereoscopic effect. One conventional way to do this is to employ a simple polarizer wheel by covering half of a disk with a linear polarizer of an arbitrary orientation, and covering the other half of the disk with a linear polarizer transmitting an orthogonal polarization. This disk is affixed to a servo motor which provides a timing pulse for synchronizing the presentation of field sequential images from the projector with the polarization modulator. To the extent that the projector output is unpolarized, the polarizer wheel produces no intensity modulation at the projector.

Figure 1A:
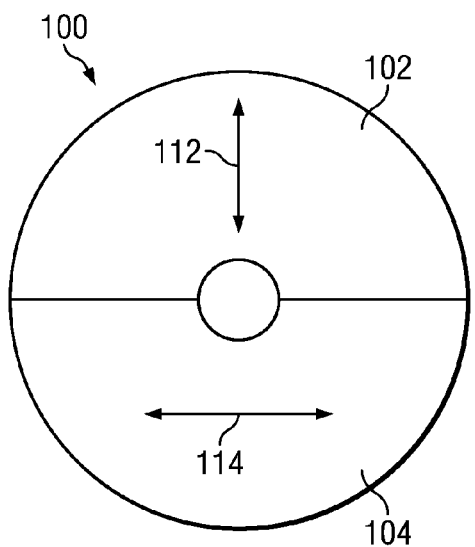
FIGS. 1A-1C are schematic diagrams illustrating polarizer wheels.
Figure 1B:
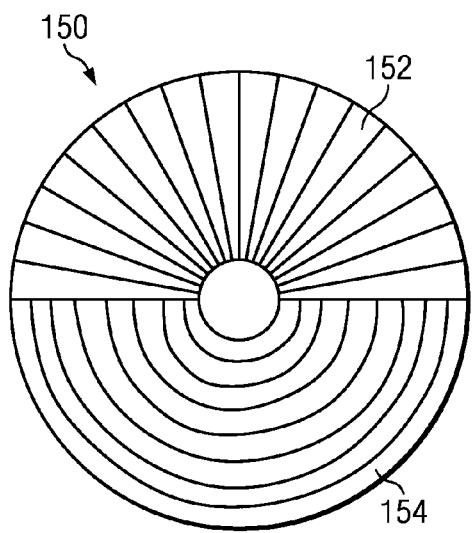
Figure 1C:
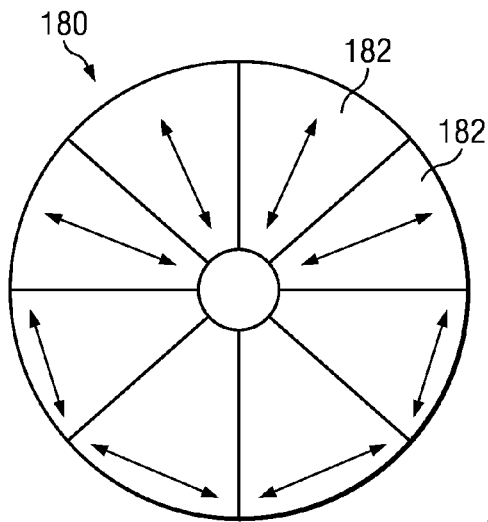

FIGS. 1A, 1B, and 1C are schematic diagrams 100, 150, and 180 illustrating conventional polarizer wheels. Referring to FIG. 1A, a simple sequential polarizer (or single segment) wheel 100 is shown. Half of the wheel 102 may transmit light having a first polarization 112 and the other half of the wheel 104 may transmit light having a second polarization 114. The second polarization 114 is orthogonal to the first polarization 112. The wheel will be affixed to a motor and the rotation of the wheel will be synchronized with the field sequential images from the projector with the polarization modulator.

The analyzing eyewear will also contain lenses with orthogonal linear polarizers. Driving the disk produces an analog rotation of the input polarizer, and consequently an analog intensity modulated transmission at the eye.

For the single segment wheel 100, optimum contrast will occur for a single orientation per field. At every half-cycle, there will be an abrupt transition between orthogonal orientations, and either a black segment in the wheel or a shuttering of the projector may be used to avoid further degradation in contrast. The minimum angular extent of this blanking depends upon the dimensions of the light patch on the wheel. However, the contrast is generally poor with a single segment wheel, so the mechanism for increasing contrast is to increase blanking time, but this is at the expense of throughput. Since all points experience substantially the same instantaneous polarizer orientation when using a single segment, the contrast ratio is expected to be uniform, provided that the blanking (spoke) time is sufficient to span the angular extent of the light patch.

Figure 2:
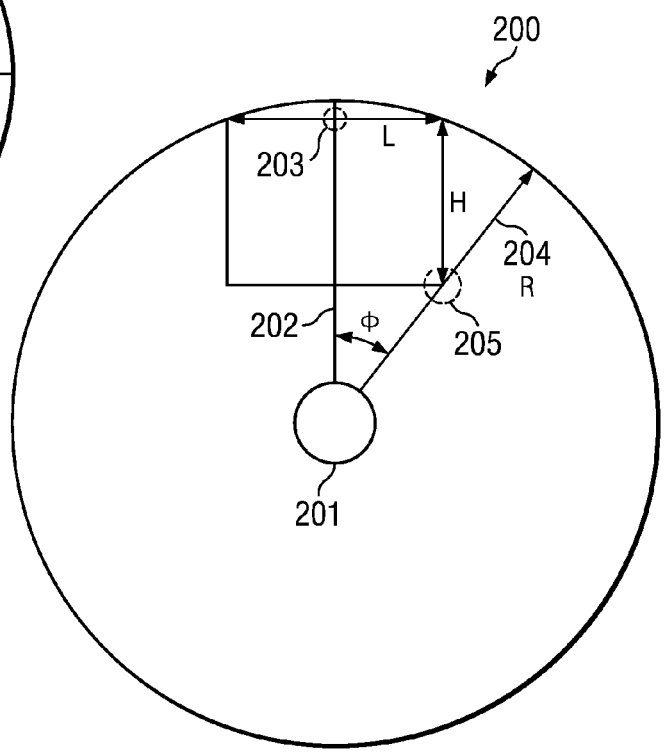
FIG. 2 is a schematic diagram illustrating the geometry of a sequential wheel and a projected light patch.

FIG. 2 is a schematic diagram illustrating the geometry of a sequential wheel 200 illuminated with a light patch of width L and height H. The wheel 200 has a radius R and an angle $\phi$ defined by the angle between a ray 202 and a ray 204. The ray 202 extends from the center of the wheel 201 through the center of the light patch 203 to the edge of the wheel 200. The ray 204 extends from the center of the wheel 201 through a bottom corner of the light patch 205. It is assumed that the 3D contrast is given as the ratio of the time-averaged on-state transmission to that of the off-state. This calculation assumes that the source illumination is temporally uniform (which for DLP systems is by no means entirely accurate). Furthermore, it should be noted at this point that modulation of the shuttering mechanism may create artifacts in time-sequential grayscale projectors, and should be minimized.

Figure 3A:
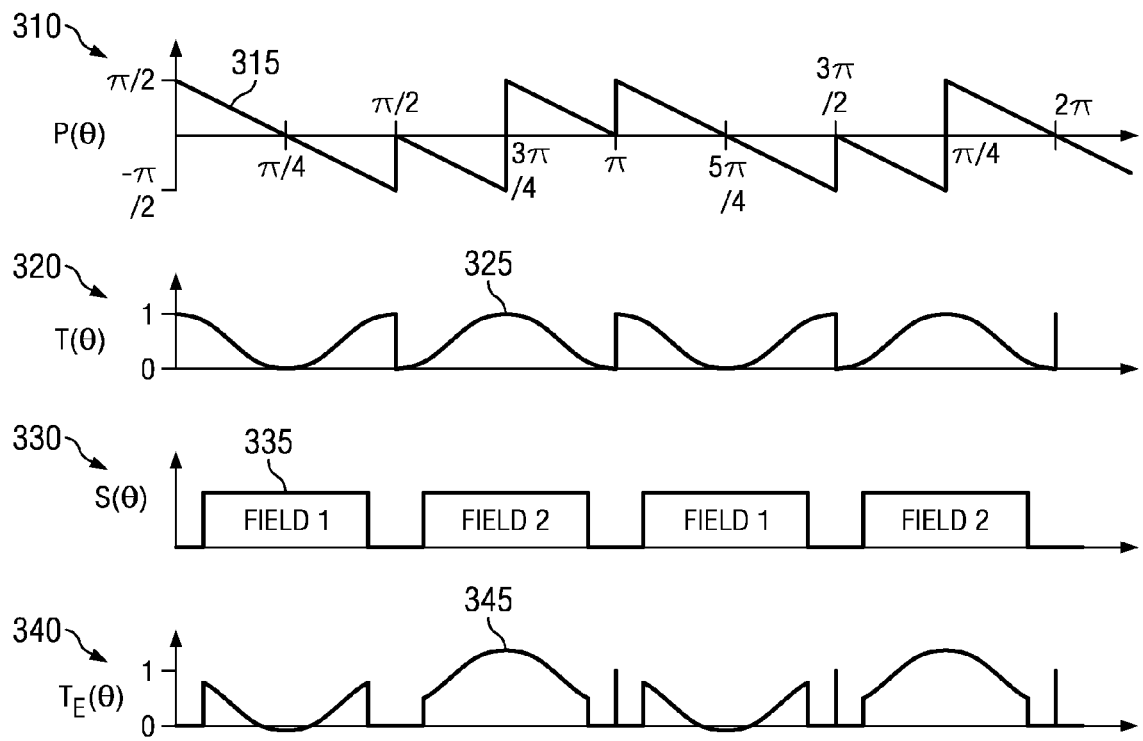
FIG. 3A is a timing diagram illustrating duty cycles of a conventional polarizer wheel.
Figure 3B:
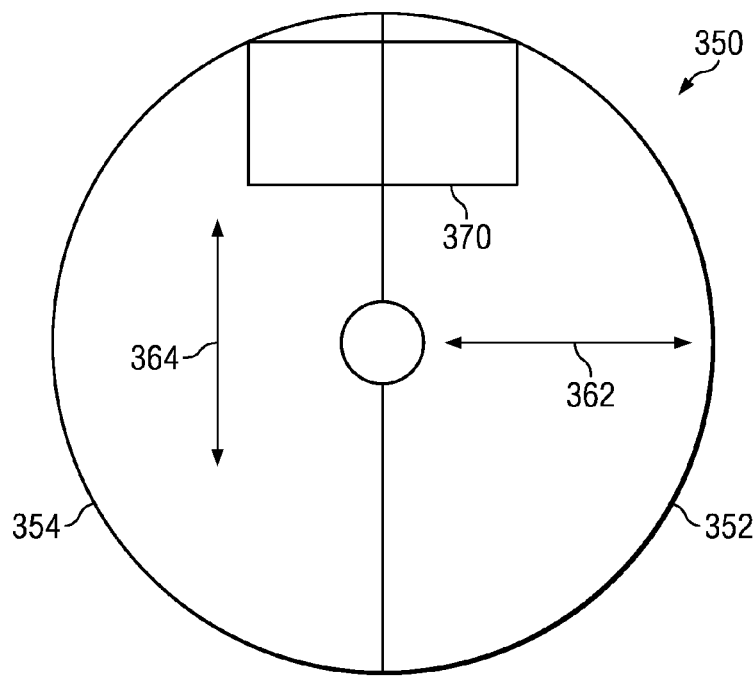
FIG. 3B is a schematic diagram illustrating the geometry of a sequential wheel and a projected light patch.

FIG. 3A is a diagram illustrating the timing 310, 320, 330, 340 for the simple single-segment polarizer wheel 350 of FIG. 3B. The single-segment polarizer wheel 350 has two polarizing halves, 352, 354. The first polarizing half 352 may transmit light at a first polarization 362. The second polarizing half 354 transmits light at a second polarization 364 orthogonal to the first polarization 362. The polarizer wheel 350 may be illuminated with a light patch 370.

Referring back to FIG. 3A, the top timing diagram 310 shows the polarizer transmission orientation 315 in the frame of the analyzer. The second timing diagram 320 shows the associated optical transmission 325. The third timing diagram 330 shows the switching 335 of the projector fields. The final timing diagram 340 shows the effective transmission 345.

The contrast ratio can be calculated from the following integrals representing the time-average transmission:

$$\bar{T}_{OFF} = \frac{2}{\tau} \int_0^{\tau/2} \sin^2(\omega_0 t) dt$$

$$\bar{T}_{ON} = \frac{2}{\tau} \int_0^{\tau/2} \cos^2(\omega_0 t) dt$$

where $\tau$ is the field duration, and $\omega_0$ is the angular frequency, which results in a contrast ratio ($CR = \bar{T}_{ON}/\bar{T}_{OFF}$) of:

$$CR = \left[ \frac{1 + \left(\frac{\sin\eta}{\eta}\right)}{1 - \left(\frac{\sin\eta}{\eta}\right)} \right]$$

where $\eta = \omega_0 \tau/\pi$ is the duty cycle.

Figure 4:
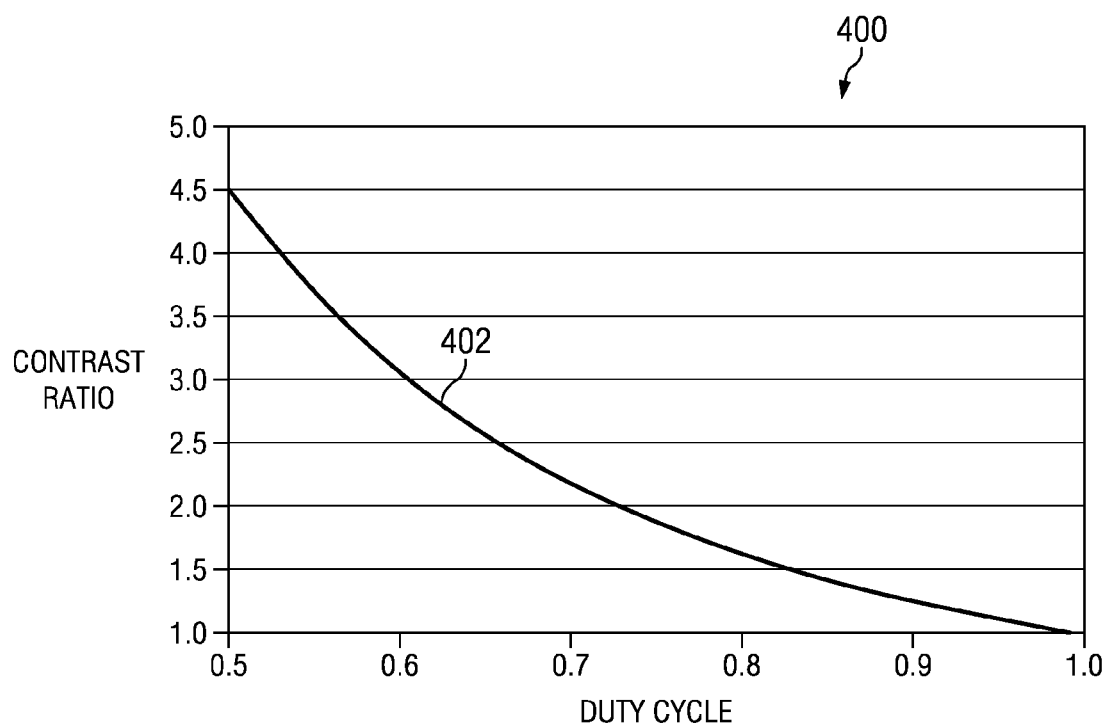
FIG. 4 is a graph illustrating contrast ratio of the conventional polarizer wheel against duty cycle.

FIG. 4 is a graph 402 representing contrast ratio as a function of duty cycle 402 for a simple single-segment linear polarizer wheel. As can be shown by the line 402, the contrast ratio dramatically decreases as the duty cycle increases. Thus, for a single-segment linear polarizer wheel, acceptable contrast is difficult to achieve at any reasonable duty cycle.

Referring back to FIG. 1B, an approach for minimizing modulation of the polarizer orientation by using a gradient orientation polarizer 150 is shown. Over half of the disk 152 polarizer transmission axes are radially oriented, and over the other half of the disk 154 the polarizer transmission axes are azimuthally oriented. Such a device is not currently practical because it is substantially incompatible with the web-based polarizer fabrication, although it is an interesting alternative to the single-segment device (shown in FIGS. 1A and 3B). The gradient orientation polarizer 150 may provide contrast limited by the polarizing efficiency of the polarizers along a single radial direction. Due to the finite size of the light patch, the contrast will degrade with angular departure from this orientation.

For systems like this, with spatial dependence in contrast, the disk/eyewear and projector are normally configured to provide the highest possible contrast at the center of the image, with performance degrading symmetrically about the vertical.

Referring now back to FIG. 2, where a light patch of width L and height H is incident on a wheel with clear aperture of radius R, the minimum blanking angle $\phi$ is given as:

$$\tan\phi = \frac{L/2}{\sqrt{R^2 - (L/2)^2} - H}$$

which is determined by the lower corners of the light patch 205, assuming that the hub is mounted below the projector as shown. The maximum contrast ratio at these worst-case locations is given by the inverse square of the above, or:

$$CR = \cot^2\phi.$$

Assuming a rough aspect ratio of L/H≈2, the hub may be positioned to the left or right of the projector, thus maximizing the duty cycle. However this may result in a left or right asymmetry in the optical response.

Figure 5:
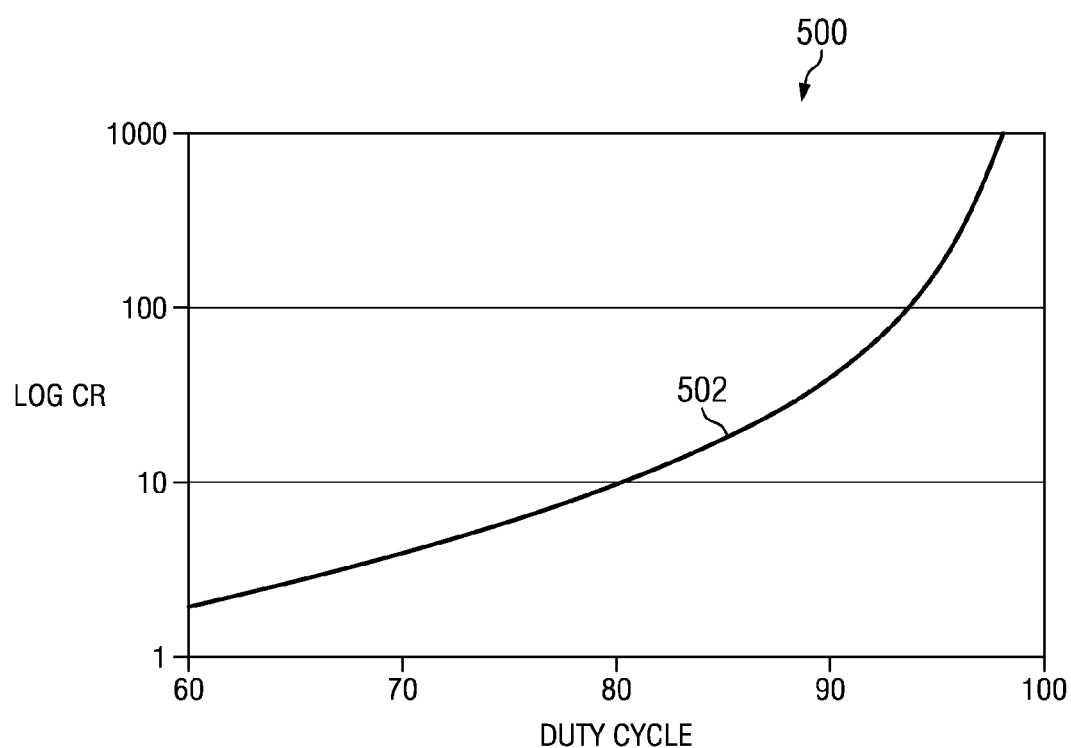
FIG. 5 is a graph of the contrast ratio of the conventional polarizer wheel against duty cycle at the worst-case angle scenario.

FIG. 5 is a graph 500 of the contrast ratio 502 in the corners, or the worst-case angle, for a radial polarizer wheel as a function of duty cycle, given by:

$$\eta = 1 - \frac{2\phi}{\pi}.$$

While this performs better than the single-segment wheel (shown in FIGS. 1 and 3B), even at a very high duty cycle of 95%, the maximum contrast in the corners is just over 100:1. At a more realistic duty cycle of 90%, the contrast ratio is approximately 50:1. As discussed above, a true gradient orientation polarizer is presently not commercially available.

Referring now to FIG. 1C, an approximation 180 of a true gradient orientation polarizer can be realized by laminating a discrete number (N) of appropriately oriented segments 182 onto a disk. This again introduces time dependence to polarizer orientation, where each point of the light patch experiences a ramp in polarizer orientation, followed by an abrupt reset. The gradient orientation polarizer thus represents an upper limit on performance, since there is no such modulation about the bias angle. But as before, the bias angle introduces a spatial dependence to contrast ratio.

When using several segments 182 per field, the contrast can be estimated by the time average over one period of the saw-tooth polarizer orientation waveform (again assuming a temporally stable source). The actual phase of the saw-tooth profile depends upon orientation relative to a particular illumination point.

FIG. 6 is a timing diagram showing the polarizer orientation waveform 602, along with the optical response 604, 606, 608 at three points on the light patch. The optical response 604 relates to a center point while the optical responses 606, 608 relate to left and right points (respectively). These points are arbitrarily selected and are separated by one period of the saw-tooth orientation waveform, and are therefore in phase. The optical response curves show the effect of the bias angle with respect to the on-state and off-state curves. Here, the center point is selected to have a substantially symmetric response 604, representing maximum contrast, while left/right points have minima/maxima that are shifted in opposing directions via the bias angle. While the specific timing of the field transition (or blanking interval) relative to the polarizer modulation may have some impact on the result, a reasonably accurate estimation of contrast is given by integration over a single period:

$$\overline{T}_{OFF} = \frac{1}{\tau}\int_{-\tau/2}^{\tau/2} \sin^2(\omega_0 t + \phi)\, dt$$

$$\overline{T}_{ON} = \frac{1}{\tau}\int_{-\tau/2}^{\tau/2} \cos^2(\omega_0 t + \phi)\, dt$$

where as before, $$\phi = \frac{\pi}{2}(1 - \eta)$$

with η the duty cycle for each field and, $$\tau = \frac{\pi}{N\omega_0}$$

where there are N polarizer segments per field. Using CR= $T_{ON}/T_{OFF}$ in the above gives the contrast ratio as, $$CR = \left[\frac{1 + \cos 2\phi\left(\dfrac{\sin\frac{\pi}{N}}{\frac{\pi}{N}}\right)}{1 - \cos 2\phi\left(\dfrac{\sin\frac{\pi}{N}}{\frac{\pi}{N}}\right)}\right].$$

Figure 7:
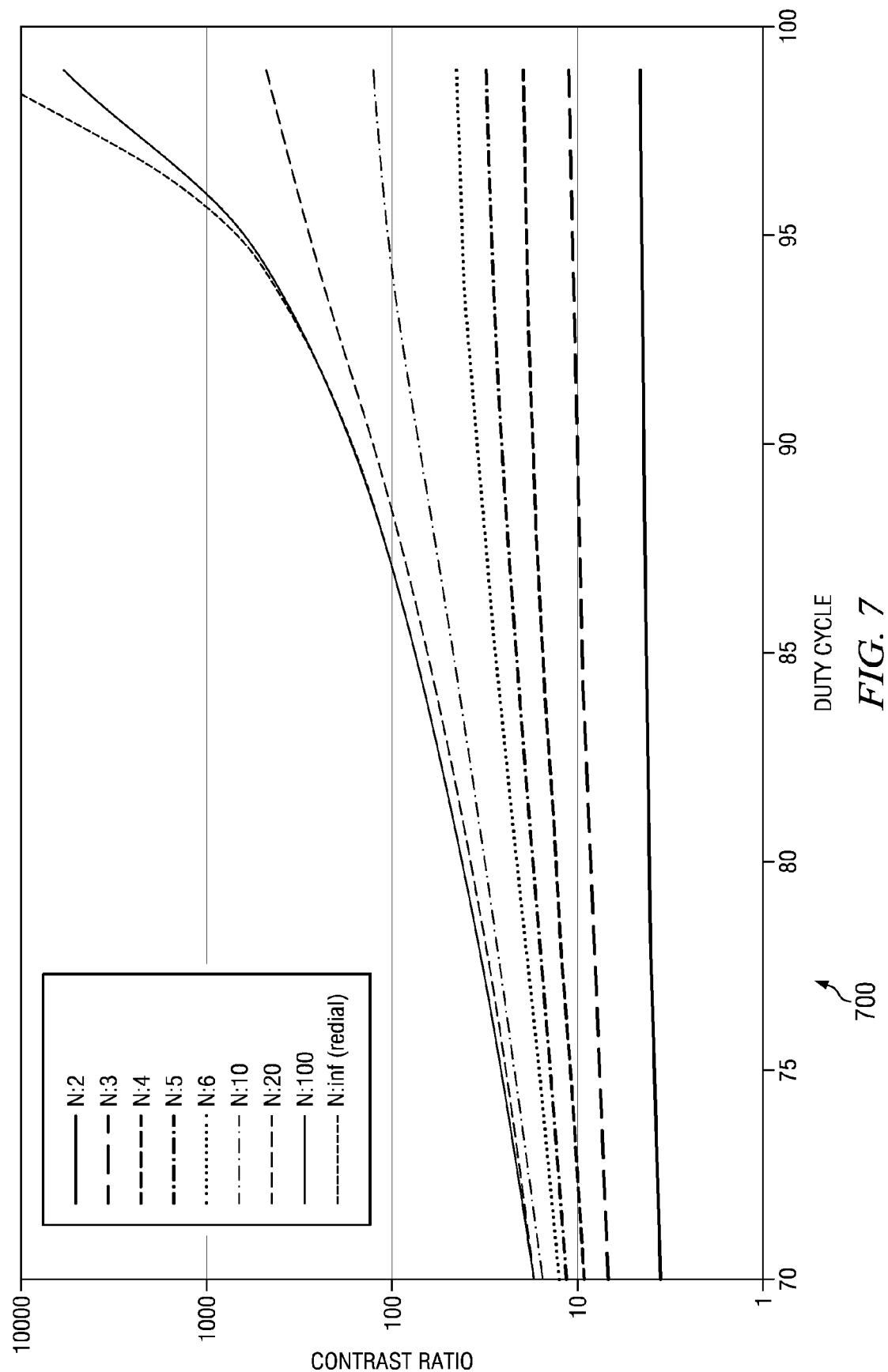
FIG. 7 is a graph of the contrast ratio versus duty cycle for a segmented linear polarizer wheel.

FIG. 7 is a graph 700 of the contrast ratio versus duty cycle for a segmented linear polarizer wheel (as shown in FIG. 1C) for several values of N. As the number of segments becomes large, reducing the range of polarizer modulation, the performance gradually improves, ultimately converging to the gradient orientation polarizer case (N→∞). Given practical considerations of duty cycle, number of segments, and polarizing efficiency, this shows that that a linear-polarizer system using a segmented wheel is not a viable high-performance product from a contrast, or cross-talk, standpoint. The above examples show that there are limitations to contrast of linear-polarizer systems imposed by the finite size of the light patch on the wheel.

One solution is to change the polarization basis set, as a means of achieving some relief from angle sensitivity. In a preferred case circular polarization is launched and is invariant under a rotation (apart from an inconsequential phase). In most practical situations, circular polarization is generated using a stretched polymer retardation film laminated at ±π/4 with respect to a linear polarizer using a pressure sensitive adhesive. This solution adds cost to the system, particularly since every eyewear lens will contain a quarter-wave film. The lowest cost option is a zero-order retarder, which provides ideal retardation at a single visible wavelength, $\lambda_o$. At other wavelengths, the retardation will deviate, and there will be an associated loss in contrast.

The Jones matrix for this case is given by:

$$t = P(\pi/2)W(-\pi/4, \Gamma)R(\phi)W(\pi/4, \Gamma)P(0)$$

where P represents a linear polarizer at the indicated orientation, W represents a linear retarder with the indicated orientation with retardation F, and R represents a rotation by angle φ. Calculating the above gives the power transmission as:

$$T_{OFF}|t_{xy}|^2 = \sin^2\phi \sin^2\delta$$

where δ is the retardation error, or $$\Gamma = \frac{\pi}{2} + \delta.$$

As anticipated, leakage transmission is zero for all φ provided that the state of polarization is circular. There are quasi-achromatic retardation films available (e.g., Teijin WB series modified PC retarders) which deliver highly stable retardation values, though zero-order retarders are relatively inexpensive and readily available.

The retardation error of a zero-order retarder is given by:

$$\delta(\lambda) = \frac{\pi}{2}\left[\frac{\Delta n(\lambda)}{\Delta n(\lambda_0)}\frac{\lambda_0}{\lambda} - 1\right]$$

where $\lambda_0$ is the design wavelength, which is typically in the cyan/green portion of the visible section. This value is typically selected as a compromise between achieving the highest photopic contrast (calling for higher retardation) and providing acceptable blue performance (calling for lower retardation). Also included in this calculation is the dispersion, or wavelength dependence of the birefringence, or $\Delta n$. Since polycarbonate is moderately dispersive and is common in the industry currently, this is a factor that should be considered.

Because the retardation dependent term is independent of orientation, the contrast calculation is proportional to the previous examples, giving the result:

$$CR(\text{circular}) = G \cdot CR(\text{linear})$$

which indicates that the circular-polarizer based system has a contrast gain factor, G, relative to the linear-polarizer based system. The effective gain can be given by the following:

$$G = \frac{\int_{\Delta\lambda} \bar{y}(\lambda)\cos^2[\delta(\lambda)]\,d\lambda}{\int_{\Delta\lambda} \bar{y}(\lambda)\sin^2[\delta(\lambda)]\,d\lambda}$$

where $\Delta\lambda$ is the visible spectrum, and $\bar{y}$ is the photopic response curve. Using polycarbonate dispersion, and a center wavelength of 516 nm, the gain factor is approximately G=26. This gain factor would apply to any of the examples given above, clearly having a significant impact on performance. Returning to the simple single-segment polarizer wheel (as shown in FIGS. 1 and 3B), the maximum possible contrast ratio is below 50:1 at a duty cycle of 74%. So even using a zero-order circular polarization system, a single-segment polarizer wheel does not deliver a desirable performance level, as used in LC-switched cinema systems.

FIG. 8 is a table 800 showing characteristic values for a commercially available stereoscopic 3D segmented polarizer wheel system. The size of the light patch is based on a typical, and by no means worst-case, configuration. Actual light patch size depends upon throw-ratio and distance of the exit pupil to the wheel (which depends upon physical extent of the lens/housing and practical proximity of the wheel).

In actuality, the image center contrast number is a best-case scenario. Taking into consideration the polarization efficiency of the projector and eyewear linear polarizers, and other depolarizing factors, the number is, in practice, significantly lower. Given typical polarizing efficiencies alone, the contrast in the center of the image can easily be halved.

Shortcomings of Conventional Techniques

Thus, there is a need for a polarization switch that provides virtually ideal binary polarization switching over a broad range of wavelengths. There is a further need for a high throughput polarization switch which is simple in construction and operates over a wide range of incidence angles. There is also a need for a polarization switch that achieves these performance goals while operating on linear polarizations, which are the most commonly generated by present mass-produced inexpensive components. There is also a need for a binary polarization switch that provides continuous smooth polarization output during each field for any selected polarization basis set (in particular linear). Additionally, there is a need for a modular system, which is capable of binary switching between any set of orthogonal polarization states through the simple substitution/addition of a passive component.

Polarization Modulation System

Embodiments disclosed in the present disclosure satisfy the above mentioned needs and may be implemented using an analog rotating wheel. Polarization control wheels of the present disclosure are useful in stereoscopic 3D systems, switchable spectral filters, binary image-shift elements for display (e.g. wobulation) or capture (e.g. anti-aliasing), and polarization metrology, among other applications. The embodiments disclosed herein may be used with any downstream polarization sensitive element to provide binary switching of some optical characteristic, whether it be polarization, position, direction, wavelength, intensity, or complex amplitude.

As discussed previously, a polarization filter wheel operating on a beam of significant spatial and spectral extent produces analog temporal modulation, position dependent polarization, or some combination of the two. This is particularly true for linear polarization, where contrast ratios are generally poor for any practical duty cycle. The present disclosure overcomes this issue by substantially eliminating rotation of polarizing elements. Polarizing elements are defined herein as structures that increase the degree of polarization of incident unpolarized light. According to the present disclosure, the input polarizing element is in a fixed position upstream of the filter wheel.

Figure 9:
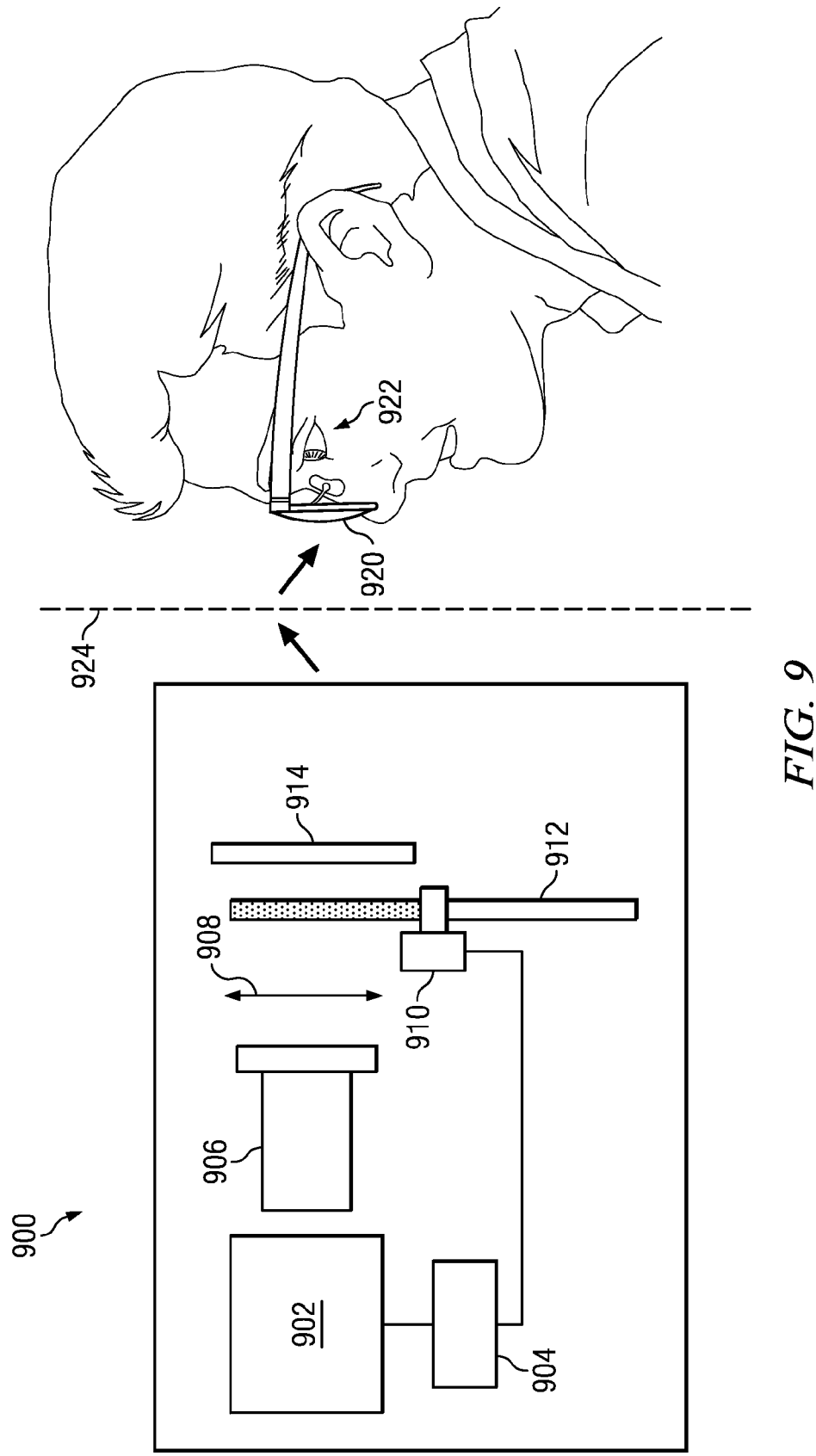
FIG. 9 is a schematic diagram illustrating a projection system, in accordance with the present disclosure.

FIG. 9 is a schematic diagram illustrating a projection system 900 capable of producing binary polarization modulation.

In an embodiment, the projection system 900 includes a projection engine 902, a synchronization mechanism 904 driving a motor 910 connected to a polarization modulation component 912. The projection system 900 may also include a projection lens 906 located on a light path between the projection engine 902 and the polarization modulation component 912.

The system 900 may include an optional input polarizer 908. The input polarizer 908 is used to polarize a non-polarized light output in cases where the projection engine outputs non-polarized light (e.g., a micromirror-based or DLP projection engine). For polarization-based projection engines, such as LCoS projection engines, the input polarizer 908 is optional to clean up polarization of the already-polarized light. The polarization modulation component 912 is positioned after the projection lens 906 (and after the optional input polarizer 908, if included). The optional input polarizer 908 is a linear polarizer. In some embodiments, the system 900 may optionally include a passive polarization transformation component 914 positioned after the polarization modulation component 912 (e.g., a quarter wave plate that is operable to transform linear polarized light into circular polarized light).

The projection system 900 may project the light output onto a screen 924. A system 900 user or viewer 922 may then view the projected images using polarization analyzing eyewear 920. FIG. 9 shows the components of the projection system 900, screen 924, and user/viewer 922 having analyzing eyewear 922. Although FIG. 9 shows a viewer or user 922 in line with a screen 924 and a projection system 900, one having skill in the art would understand that this depiction is for illustrating the system, screen, and user, but that the projected images are actually projected onto the screen 924 in a standard front-projection arrangement. An actual user/viewer 922 would be positioned on the same side of the screen 924 as the projection system 920 and would view the reflected images from the screen 924. In an embodiment, the screen 924 may be a polarization preserving front projection screen (e.g., a silver screen or a screen as taught in U.S. patent application Ser. No. 12/361,532 to Coleman et al., herein incorporated by reference).

Figure 10:
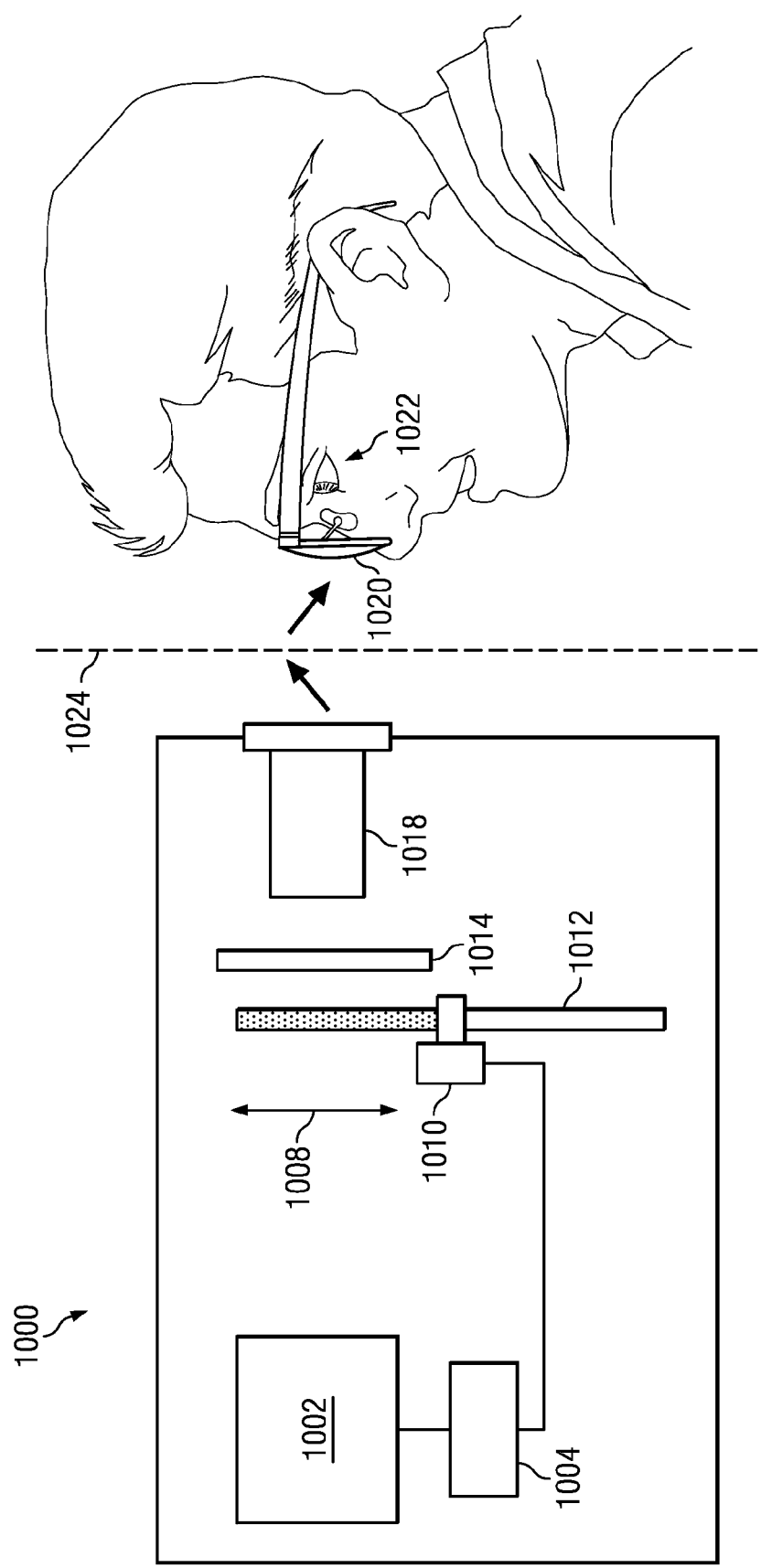
FIG. 10 is a schematic diagram illustrating another projection system, in accordance with the present disclosure.

FIG. 10 is a schematic diagram illustrating a projection system 1000 capable of producing binary polarization modulation. Projection system 1000 is similar in principle to projection system 900 described in FIG. 9, except projection lens 1018 is located after polarization modulation component 1012.

In this exemplary embodiment, the projection system 1000 includes a projection engine 1002, a synchronization mechanism 1004 driving a motor 1010 connected to a polarization modulation component 1012. The projection engine 1002 and polarization modulation component 1012 are enclosed in a projector 1016 having a projection lens 1018 located on a light path following the polarization modulation component 1012. In this embodiment, the system 1000 may include an optional input polarizer 1008. The polarization modulation component 1012 is positioned after the projection engine 1002 (and the optional input polarizer 1008, if included). The optional input polarizer 1008 is a linear polarizer. In some embodiments, the system 1000 may optionally include a passive polarization transformation component 1014 positioned after the polarization modulation component 1012. In some embodiments, the polarization modulation component 1012 may be a rotating retarder stack filter wheel.

The projection system 1000 may project the light output onto a screen 1024. A system 1000 user or viewer 1022 may then view the projected images using polarization analyzing eyewear 1020. FIG. 10 shows the components of the projection system 1000, screen 1024, and user/viewer 1022 having analyzing eyewear 1022. Although FIG. 10 shows a viewer or user 1022 in line with a screen 1024 and a projection system 1000, one having skill in the art would understand that this depiction is for illustrating the system, screen, and user, but that the projected images are actually projected onto the screen 1024 in a standard front-projection arrangement. An actual user/viewer 1022 would be positioned on the same side of the screen 1024 as the projection system 1020 and would view the reflected images from the screen 1024. In an embodiment, the screen 1024 may be a polarization preserving front projection screen (e.g., a silver screen or a screen as taught in U.S. patent application Ser. No. 12/361,532 to Coleman et al., herein incorporated by reference).

Figures 11, 12:
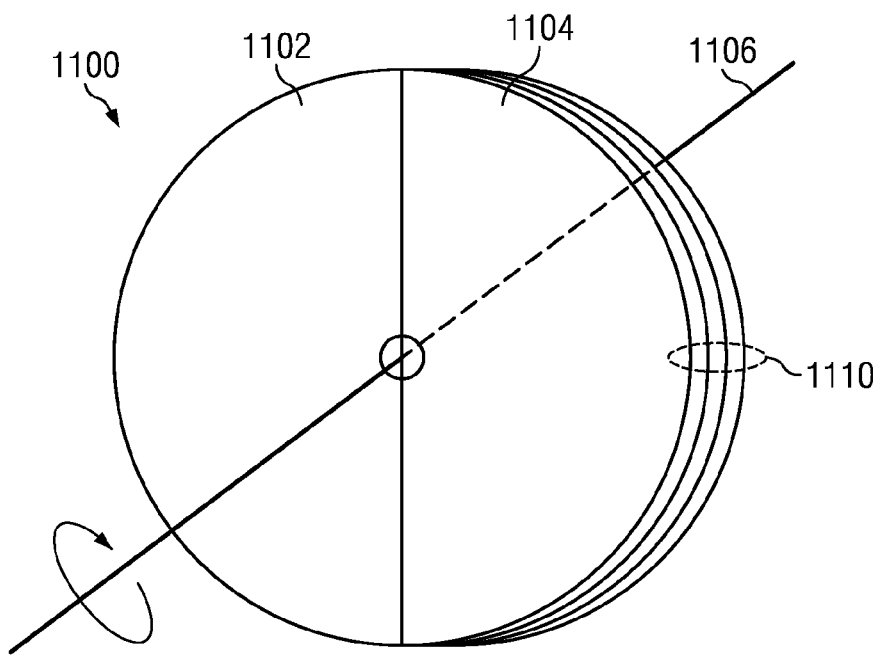
FIG. 11 is a schematic diagram of an exemplary polarization modulator wheel, in accordance with the present disclosure.
FIG. 12 is a table providing exemplary angles for a 12-layer retarder stack, in accordance with the present disclosure.

FIG. 11 is a schematic diagram illustrating an embodiment of a polarization wheel 1100. The polarization wheel 1100 has a first circular arc 1102 and a second circular arc 1104. In an embodiment, at least one of the first circular arc 1102 and the second circular arc 1104 is a retarder stack filter (as indicated by 1110). The wheel 1100 rotates around an axis of rotation 1106 and is positioned in a linearly polarized light path so that the linearly polarized light is rotated by a predetermined angle when it passes through one or both of the first circular arc 1102 and the second circular arc 1104.

In another embodiment, both of the first circular arc 1102 and the second circular arc 1104 are retarder stack filters. The first retarder stack filter 1102 is a θ degree polarization state rotator and the second retarder stack filter 1104 is a (θ−90) degree polarization state rotator. For example, the first retarder stack filter 1102 may be a +45 degree polarization state rotator while the second retarder stack filter 1104 may be a −45 degree polarization state rotator. In an embodiment, the first retarder stack filter 1102 and the second retarder stack filter 1104 both are finite infinite response (FIR) filters, and may generate at least N+1 spatially offset light pulses in response to a linearly polarized light impulse input.

The polarization wheel 1100 is able to transmit light such that the polarization state of light on the light path exiting the first circular arc 1002 is orthogonal to the polarization state of light on the light path exiting the second circular arc 1004. For example, in an embodiment the first circular arc 1102 may transform the polarization state of input polarized light by 90 degrees, and the second circular arc 1104 may not transform the polarization state of the input polarized light.

In en embodiment, the first circular arc 1102 and the second circular arc 1104 are made of substantially dispersionless retarder material (e.g., cyclic-olefin-copolymer, polycarbonate, etc.) and may also include an antireflective coating.

As discussed above, the polarization wheel 1100 may be used as a polarization modulation device. In an embodiment of a polarization modulation device, a polarization wheel 1100 may also be used in conjunction with a quarter wave retarder on the light path following the polarization wheel. The quarter wave retarder may be oriented at +45 degrees with respect to the state of polarization emanating from the first circular arc 1102, and oriented at −45 degrees with respect to the state of polarization emanating from the second circular arc 1104.

The polarization wheel contains unitary polarization transforming elements, and as such, is capable of transforming the state of polarization. Under a unitary transformation, input orthogonal polarizations will remain so after passage through the structure.

Given a fixed input linear polarizer, the output polarization can be binary modulated, provided that the polarization transforming elements perform the proper function independently of their orientation with respect to the analyzer. Consider the simple case of a linear polarizer followed by a polarization wheel that is used to transmit the polarization unchanged in one state, and to convert the alternate state to the orthogonal polarization. For the first state, the wheel may be isotropic to transmit the beam with polarization unchanged. For the second state, the second field should be converted to the orthogonal linear polarization, independent of the wheel orientation.

As discussed previously, circular polarizations are a special case in that they are inherently invariant under rotation. Circular states are, thus, the key to obtaining binary switching with analog rotation, much like the circular polarizer wheel example discussed previously. In that particular case, however, ideal system level performance was obtained using achromatic circular polarizers, both at the projector and at the analyzer. The polarization transforming element may possess circular Eigen-polarizations, so maintaining the orthogonal polarization during rotation means maintaining a phase difference between orthogonal circular polarization states. This means that the transforming element should have virtually zero linear retardation, or is equivalently optically active.

Optical activity (e.g., as found in quartz) is defined herein as the property of possessing circular eigen-polarizations.

Eigen-polarizations are defined as the set of orthogonal polarization states that are individually transmitted with polarization unchanged by an anisotropic structure, differing by a phase factor. Mathematically, these are the polarization states that diagonalize the Jones matrix. In effect, optically active materials behave identically to linear retarders, except that the basis vector is circular rather than linear. In the event that this phase retardation is half-wave, an input linear polarization is in general converted to the orthogonal state of polarization. This is because the projection of a linear state of any orientation always results in equal amplitude circular states in the optically active medium. Consider the case of a lossless medium, where the polarization transformation virtually conserves power (e.g. no dichroism). In this case, the phase retardation determines the angle of rotation, and as such, preserving a half-wave of retardation insures that the orthogonal linear state is transmitted. However, ideal performance occurs for an optically active medium that maintains a half-wave of retardation independent of wavelength. Such an achromatic optically active component does not exist in the natural world.

The present disclosure pertains to the design, fabrication, and system level use of synthetic achromatic optically active elements. As discussed above, the structures of the present disclosure utilize stacks of linear retarders as the building blocks that produce these properties, which among other things, are incorporated into analog wheels to produce binary polarization switching.

One design consideration is that the optically active retarder stack structures should possess zero net linear retardation. In multi-layer retarder stacks, this is frequently referred to as compound retardation. Given that the base material possesses only linear retardation, this can be considered an exercise in building up a prescribed optical activity, from the compounding effects of multiple properly oriented elements, while suppressing linear compound retardation. One such method is to design the retarder stack structure as two units; one possessing half of the desired optical activity (at each wavelength), having arbitrary compound linear retardation, the other possessing the same optical activity, but with the opposite (or crossed) compound linear retardation. When the two units are paired, the linear retardation is virtually eliminated, while the optical activity is doubled. This has the benefit of being a deterministic design methodology, based purely on power transmission considerations. Such retarder stacks can be designed using the network synthesis techniques (as discussed by Robinson et al. in "Polarization Engineering for LCD Projection," Ch. 6, Wiley & Sons (2004), herein incorporated by reference), in conjunction with conventional finite impulse response (FIR) design methodologies.

Retarder stacks that produce a desired polarization rotation by forcing zero/unity power projected along an arbitrarily oriented axis relative to the input can be designed. For a particular number of films selected to achieve design requirements, it is advantageous to force the spectral side lobes to remain below a prescribed level (e.g. <0.1%) for the maximum possible spectral bandwidth. This insures efficient use of retarder material, and in the event that the spectral coverage exceeds that desired, it is often desirable to reduce the number of retarder layers. As in any FIR design, there is a fundamental tradeoff between side-lobe level and spectral coverage for a particular number of layers. The spectral response of the stack between parallel/crossed polarizers (in frequency space) is symmetric about the half-wave wavelength of the base film retardation, so as before, this tends to be in the cyan/green portion of the visible. In designs that minimize the number of films, the center wavelength is typically selected to provide a balance between short-blue and long-red leakage.

Based on the above design method, the half-stack produces a rotation of $\pm\pi/4$, again with arbitrary output compound linear retardation. A stack with the same rotation sense, with crossed compound retardation can be formed using the same stack design, but with order and angle signs reversed. An analogous situation occurs when following a retarder stack with a mirror. After reflection, the retarders are encountered in reverse order, but effectively with the angles unchanged. The resulting polarization transformation in this case is based on doubling of retardation and elimination of rotation. So by reversing the sign of the angles, the opposite effect occurs.

FIG. 12 is a table 1200 providing angles for a 12-layer retarder stack that produces substantially pure achromatic rotation of $\pi/2$ adhering to the reverse-order-reflection symmetry. Note that this symmetry is a sufficient, but not necessary condition for achieving the desired polarization transformation. Search algorithms can similarly identify stack designs with the desired behavior, but which do not conform to the reverse order reflection symmetry. It is easily verified that the state of polarization after the sixth layer is $\pi/4$-oriented linear, though the stack possesses linear compound retardation that is substantially eliminated by the subsequent stack. This design is sufficiently achromatic to span the entire visible spectrum (400-700 nm) based on the dispersion of polycarbonate.

The spectral range over which it is possible to have achromatic behavior is highly dependent on the number of films. For a projection system, where it is sufficient to have near ideal performance in the 430-670 nm band, with gradual fall-off in performance tolerable outside of that range, the number of layers may be reduced. Moreover, if a near dispersionless retarder material, such as cyclic-olefin-copolymer (COC) is used as an alternative to polycarbonate, the number of layers can be further reduced.

FIG. 13 is a table 1300 showing a six-layer pure achromatic rotator design sufficient for most projection applications.

Figure 14:
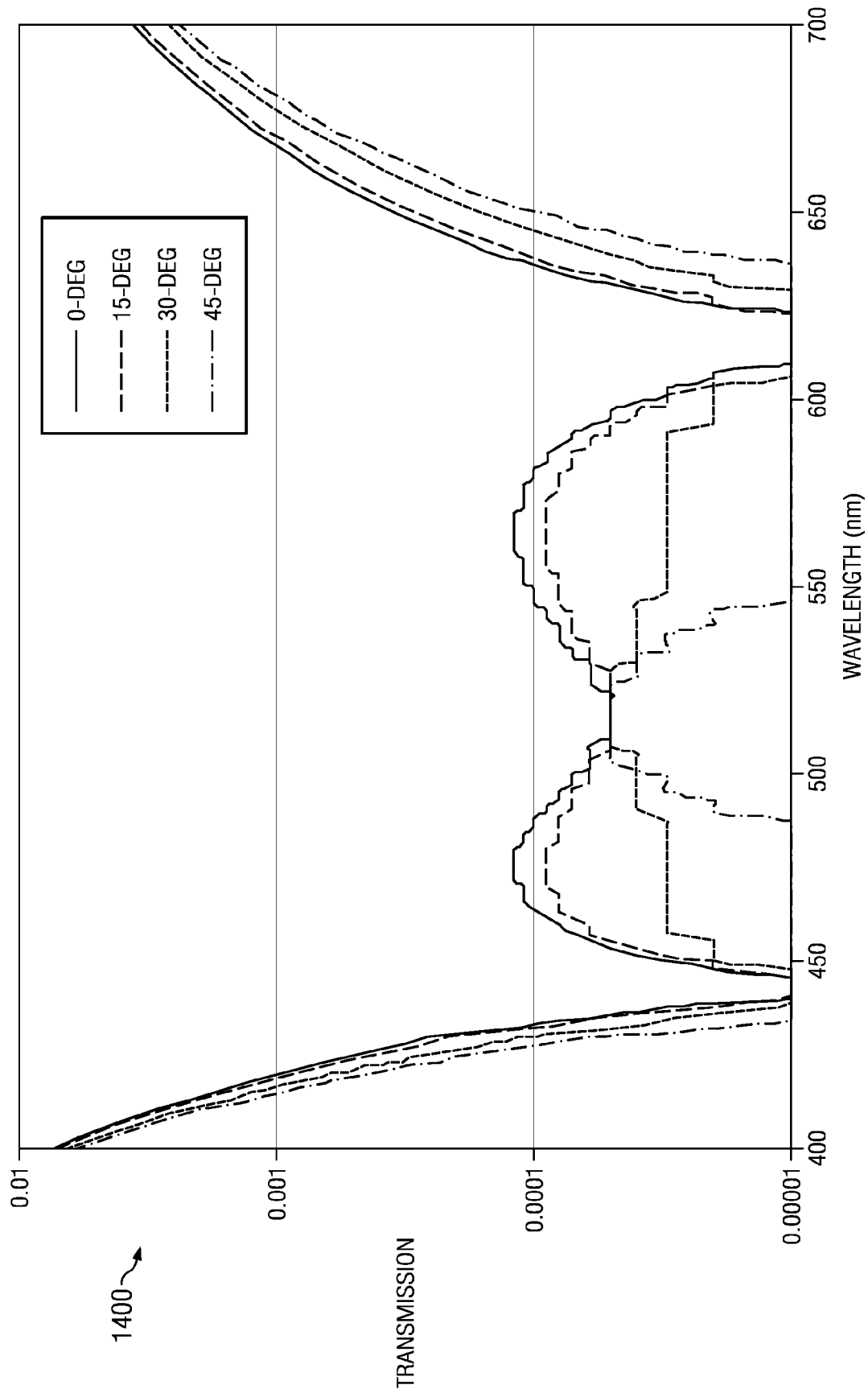
FIG. 14 is a graph illustrating the transmission leakage for a six-layer achromatic rotator stack, in accordance with the present disclosure.

FIG. 14 is a graph 1400 illustrating the transmission leakage for a six-layer achromatic rotator stack rotated between parallel polarizers. It shows the spectral response of the stack of FIG. 13 using the properties of a cyclic-olefin-copolymer (COC) half-wave retarder centered at 516 nm. The graph 1400 shows transmission leakage versus wavelength when the stack is placed between parallel polarizers and rotated in increments of $\pi/12$. Just like a single retarder, the transmission response of any retarder stack is symmetric with respect to $\pm\pi/4$. If the stack is rotated this angle, the full range of transmission curves may be traced. FIG. 14 also shows that the contrast ratio for linear polarization in the $\pi/2$-rotation state exceeds 1000:1 over the spectral range of 416 nm to 670 nm, for any stack orientation. The average photopic leakage, ignoring projector source characteristics, is given by:

$$\overline{L}_{OFF} = \frac{4}{\pi\Delta\lambda} \int_0^{\pi/4} \int_{\Delta\lambda} \overline{y}(\lambda) T_P(\lambda, \theta) d\lambda d\theta$$

where $T_P(\lambda,\theta)$ is the power transmission for the achromatic rotator stack between parallel polarizers, oriented at angle $\theta$ with respect to the design orientation. Since the on-state is provided by an isotropic segment of the wheel, it is reasonable to assume an ideal achromatic response with no orientation sensitivity, which again assuming a flat-top source, is the total lumen output:

$$\overline{L}_{ON} = \int_{\Delta\lambda} \overline{y}(\lambda)d\lambda.$$

For the example of FIGS. 13 and 14, this gives an average contrast ratio ($\overline{L}_{ON}/\overline{L}_{OFF}$) exceeding 20,000:1, so on-axis system level performance would, in general, be limited by other aspects of the system. At this level, the contrast may also be limited by the polarizing efficiency of the projector and eyewear linear polarizers. High performance linear polarizers can deliver 4,000:1 contrast, but only over a very limited range of incidence angles.

One method for fabricating the wheel is to laminate the retarder stack to a low birefringence glass/acrylic substrate over half of the disk using a pressure-sensitive-adhesive (PSA). This creates severe wheel balancing problems, so either a counter-weight, or an additional isotropic substrate may be laminated to the other half. Anti-reflective (AR) coatings can be applied directly to the stack and wheel substrate using low temperature processes. One concern is that flatness of the retarder stack may not yield acceptable image quality with this arrangement.

A method for construction of the wheel with high optical quality can be done in a sandwich arrangement. This can be done by bonding the layers between two optical quality, low-birefringence anti-reflective coated substrates. The retarder stack covers half of the disk, with an isotropic spacer of matched thickness over the other half. The pieces are fixtured and pressed together with a water-clear, index-matched (e.g. thermoset or uv-cure) adhesive. When using cyclic-olefin-copolymer (COC), which has a low stress optic coefficient, relatively hard (e.g., acrylic) UV cure adhesives are allowed for assembly, yielding a more rigid assembly. Typical bond-line thicknesses are in the range of a few tens of microns, so it is beneficial to match the thicknesses very closely. Moreover, the mass of the glass spacer is different than the retarder stack, which can still create some wheel balancing challenges.

An alternative approach is to place retarder stacks having equal and opposite rotation angles on both sides of the wheel. This substantially eliminates the need for a spacer and provides a balanced specification for the polarization manipulation used for each state. Since the rotation is halved, the number of layers may also be reduced while maintaining overall contrast performance.

The previous design methodology could be generalized to arbitrary rotation angles. Consider the design methodology discussed previously for the 90° rotator. The general relationship between the angles in each stack is:

$$[\alpha_1, \alpha_2 \ldots \alpha_N][-\alpha_N \ldots -\alpha_2 \ldots -\alpha_1]$$

where each stack produces half of the desired rotation. This arrangement of angles has reflection symmetry with respect to 0. If the rotation angle is generalized to θ, the relationship according to the present disclosure is:

$$[\alpha_1, \alpha_2 \ldots \alpha_N]$$
$$[-(\alpha_N+\pi/2-\theta) \ldots -(\alpha_2+\pi/2-\theta), -(\alpha_1+/2-\theta)]$$

which has reflection symmetry with respect to the angle (θ/2−π/4).

Thus, in an embodiment, a methodology for designing retarder stacks for a polarization modulating wheel is disclosed. First, a desired composite rotation angle, represented by θ is selected. Next, assuming an input polarization along 0, a retarder stack that produces (virtually) zero power transmission at angle (θ+π)/2 may be designed. Then a second stack according to the above equation may be designed.

FIG. 15 is a table 1500 of one solution using the above described method. In this figure, ±45° achromatic rotator stacks are used to switch between orthogonal linear polarizations.

Figure 16:
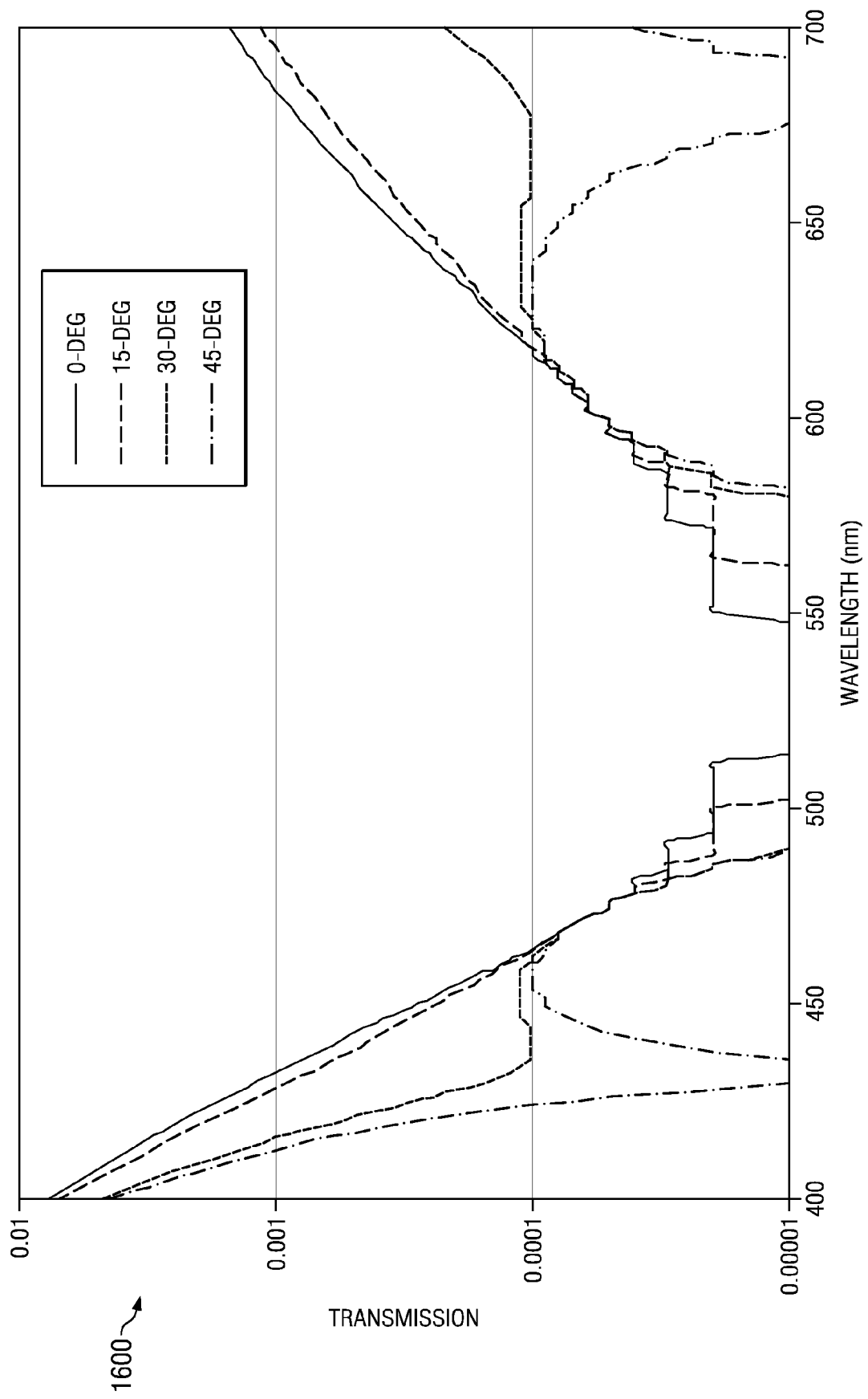
FIG. 16 is a graph illustrating the transmission of an ideal analyzer, in accordance with the present disclosure.

FIG. 16 is a graph 1600 illustrating the transmission of an ideal analyzer at −45° using a six-layer achromatic +45° rotator stack. The graph 1600 shows the light leakage by an ideal orthogonal analyzer as the retarder stack is rotated from the design angle through 45°. This shows that the contrast is above 1,000:1 over most of the visible spectrum for any orientation. Moreover, the photopic contrast assuming a flat-top source varies from 22,000:1 (at the design angle), to a maximum of 34,500:1 (when rotated 45°). So again, while the system contrast may be dominated by other leakage sources, it is noteworthy that the modulator would contribute negligibly to the result.

In order to modulate between orthogonal linear states, a second stack can be constructed with the angle signs reversed, as shown in FIG. 13. This has the effect of changing the sign of polarization rotation, but with substantially identical spectral results. Using an input polarizer with transmission along the horizontal, the wheel will switch between +45° and −45° linear polarization with a high degree of precision, as shown above. Using eyewear with the same orientation, high contrast shuttering is enabled.

This example arbitrarily places the input polarizer along a specific direction. In an embodiment, one requirement for shuttering may be that the two polarization states exiting the wheel correspond to the orientation of linear polarizers in the eyewear.

The present disclosure enables high contrast linear-polarizer based stereoscopic 3D systems. However, such systems assume that the analyzer is held in the same reference frame as the input polarization. Contrast can in practice degrade quickly, either via geometrical rotations, or head tilt. Sensitivity to rotation about the optic axis (due to head tilt) may be eliminated by launching and analyzing circular polarization, as discussed previously. A circular polarizer based system is possible with the present disclosure. In general, circular polarization is permitted by placing a quarter-wave retarder after the wheel oriented at ±45° with respect to the linear polarization states exiting the wheel. This is accompanied by a crossed quarter-wave retarder in each lens, with the analyzers oriented as before. Note that this arrangement enables an achromatic on-state, as the quarter-wave retarders vanish in the on-state. Again, if achromatic quarter-wave retarders are used at the projector and in the eyewear, then there is negligible contrast degradation with head-tilt.

In short throw situations, stereoscopic 3D systems can have contrast limited by the field of view of the polarization modulator. In this case, the contrast is determined by the off-state leakage, which in one eye is given by the isotropic segment between crossed polarizers, and in the other eye is given by the achromatic rotator between parallel polarizers. Assuming that the wheel is isotropic in this state, leakage from the former is determined by the geometrical rotation of crossed polarizer axes in the ±π/4 azimuth. Contrast remains near ideal in the 0, π/2 azimuth, since the polarization projection is along an eigen direction.

Figure 17:
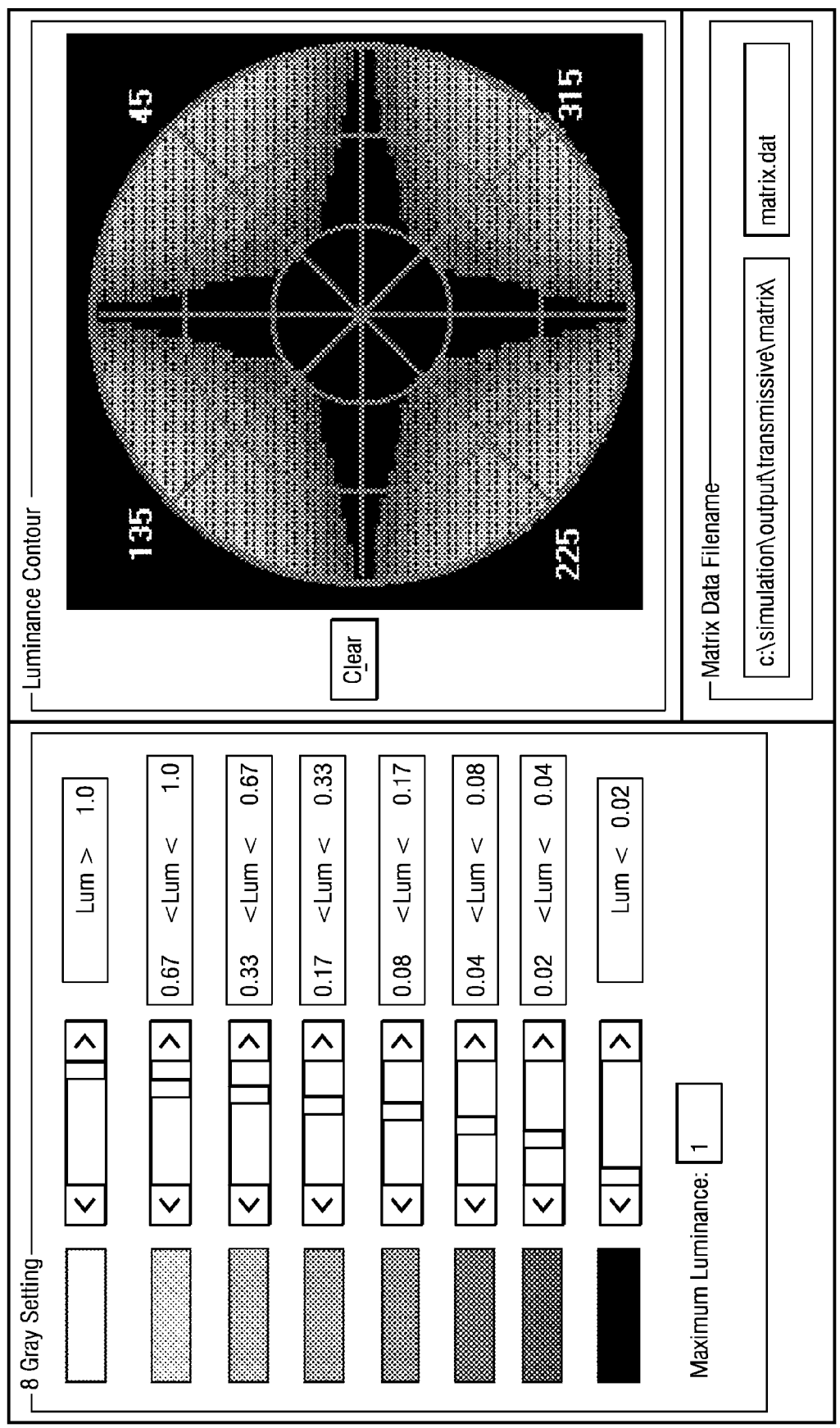
FIG. 17 is a plot of leakage of crossed polarizers, in accordance with the present disclosure.

FIG. 17 is a polar plot 1700 of lumen leakage of crossed polarizers, assuming 100 lumen input. This polar plot for crossed polarizers is shown for a maximum incidence angle in air of 40-degrees. In the other eye, contrast is determined by the angle sensitivity of the retarder films that make up the stack. Since the polarizers are parallel, there are negligible geometrical leakage effects.

Figure 18:
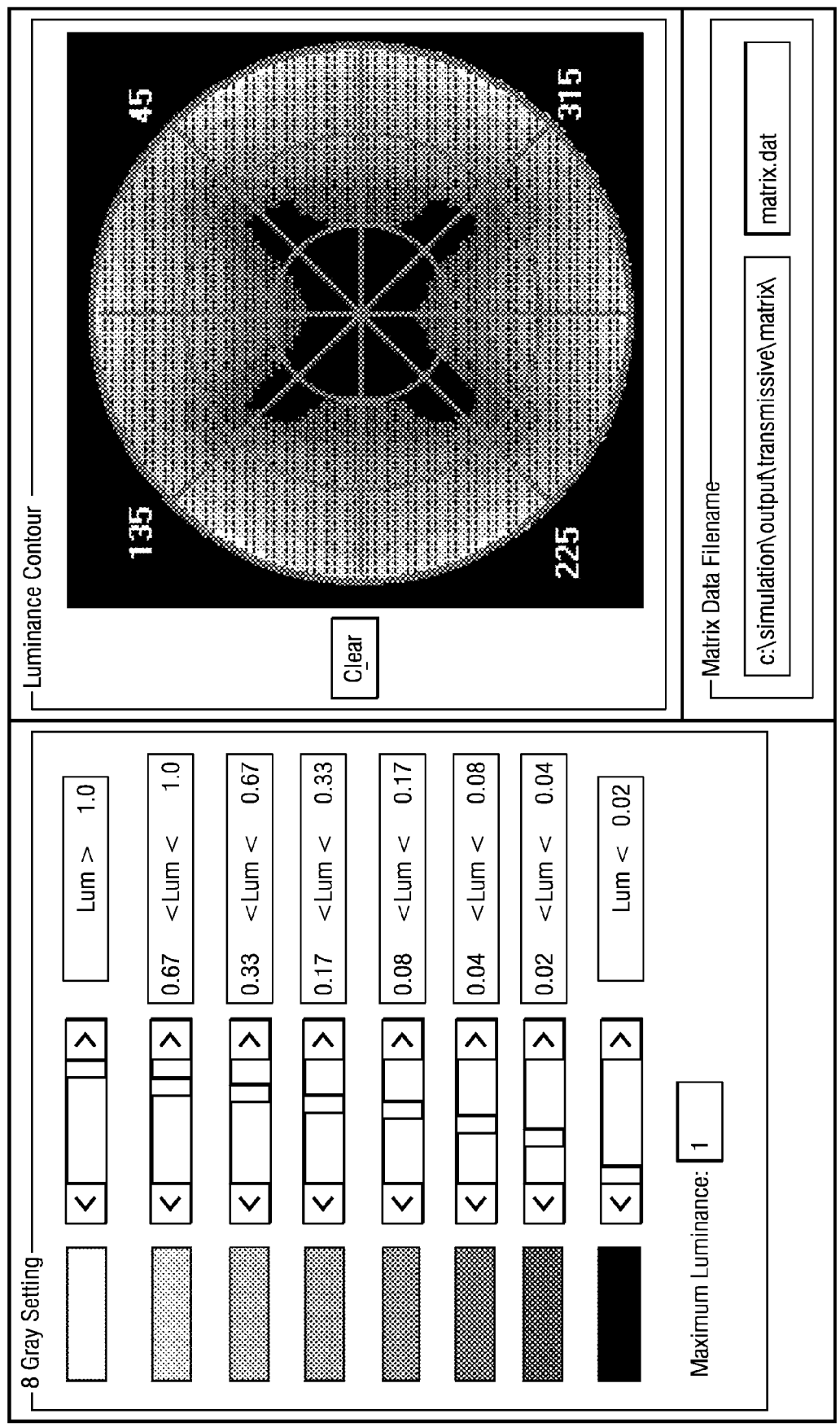
FIG. 18 is a plot showing leakage of a pure achromatic rotator between parallel polarizers, in accordance with the present disclosure.

FIG. 18 is a polar plot 1800 showing leakage of a pure achromatic rotator between parallel polarizers for a 100 lumen input. When the stack is composed of uniaxial films, the polar plot is as shown.

The crossed polarizer case yields a worst-case azimuth contrast ratio of 1,000:1 at a 22-degree incidence angle (in air). This degrades to 400:1 at an incidence angle of 30-degrees. As for the rotator state, the worst-case azimuth contrast ratio of 1,000:1 is approximately 20-degrees, with a 250:1 contrast ratio at 30-degrees. So despite the presence of a six-layer uniaxial retarder stack, the overall performance is somewhat similar.

In the event that high contrast is desired over broader field of view, there are options for increasing performance. In the parallel-polarizer off-state, geometrical rotation of the axis is common to both polarizers and, provided that the stack maintains the normal incidence polarization transformation, the contrast may be preserved. By constructing the stack of biaxial retarder films (e.g., as fabricated by companies such as Nitto-Denko, Corp.) (with Nz=0.5), we obtain the polar plot shown in FIG. 18. In this case, the plot covers a range out to 80-degrees half-angle, with much better contrast ratio. At an incidence angle of 60-degrees, the worst-case azimuth contrast ratio is 4,760:1.

To minimize issues with geometrical rotation in the crossed polarizer off-state, a different form of compensation can be used. One example of this is to laminate a biaxial half-wave retarder (again with Nz=0.5) to the input polarizer along the transmission axis. The half-wave retarder has substantially no function at normal incidence, and for any incidence angle in the 0/90-degree azimuth. However, at other azimuth angles, the optic axis remains stable, while that of the polarizer undergoes a geometrical rotation. The polarization reflection associated with the half-wave retarder is ideal for reorienting the input polarization to lie along the absorption axis of the analyzer. In an embodiment, every eyewear lens should contain an additional compensator.

As stated previously, the binary polarization switches of the present disclosure may also be used to produce other forms of modulation. Binary switching of linear polarization enables binary switching of other aspects of a beam using subsequent polarization sensitive components. By following the device with a polarization splitter (e.g., a Wollaston prism or grating polarization splitter), a binary beam-steerer is enabled. By following the device with a polarization selective spectral filter (e.g., a color polarizer as manufactured by Polatechno or ColorLink), switchable filtering is enabled. By following the device with a beam-displacing prism (or walk-off prism), binary shifting of a beam or image is enabled.

Additionally, binary polarization switching has numerous applications in metrology and diagnostics. This includes applications such as polarimetry, where the objective is to use sequentially methods to analyze the state-of-polarization of an input beam. It can also include diagnostic applications such as optical coherence tomography.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent. As may be used herein, the term "substantially negligible" means there is little relative difference, the little difference ranging between less than one percent to ten percent.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A polarization modulator operable to temporally modulate incoming linearly polarized light on a light path, comprising:
 a polarization wheel located on the linearly polarized light path, the polarization wheel having a first circular arc and a second circular arc,
 wherein at least one of the first circular arc and the second circular arc comprises a multi-layer retarder stack filter having a plurality of linear retarders.

2. The polarization modulator of claim 1, wherein the retarder stack filter has substantially negligible retardation.

3. The polarization modulator of claim 1, wherein the retarder stack filter has a circular basis vector.

4. The polarization modulator of claim 1, wherein the retarder stack filter rotates the linearly polarized light by a predetermined angle regardless of the angular position of the polarization wheel.

5. The polarization modulator of claim 1, wherein the retarder stack filter has substantially constant phase difference between right and left hand polarization within a visible light spectrum.

6. The polarization modulator of claim 1, wherein the first circular arc comprises a first retarder stack filter and the second circular arc comprises a second retarder stack filter.

7. The polarization modulator of claim 6:
 wherein the first retarder stack filter rotates the linearly polarized light by a first predetermined angle when illuminated by the linearly polarized light, regardless of the angular position of the first circular arc,
 wherein the second retarder stack filter rotates the linearly polarized light by a second predetermined angle when illuminated by the linearly polarized light, regardless of the angular position of the second circular arc,
 wherein the first predetermined angle is orthogonal to the second predetermined angle.

8. The polarization modulator of claim 6:
 wherein the first retarder stack filter is a $\theta$ degree polarization state rotator, and
 wherein the second retarder stack filter is a $(\theta-90)$ degree polarization state rotator.

9. The polarization modulator of claim 8:
wherein the first retarder stack filter is a +45 degree polarization state rotator, and
wherein the second retarder stack filter is a −45 degree polarization state rotator.

10. The polarization modulator of claim 1, wherein the polarization state of light on the light path exiting the first circular arc is orthogonal to the polarization state of light on the light path exiting the second circular arc.

11. The polarization modulator of claim 1, wherein the first and second circular arcs each provide halves of the polarization wheel.

12. The polarization modulator of claim 1, wherein the first circular arc transforms the polarization state of input polarized light by 90 degrees, and the second circular arc does not transform the polarization state of the input polarized light.

13. The polarization modulator of claim 2, wherein the first circular arc and the second circular arc each comprise a substantially dispersionless retarder material.

14. The polarization modulator of claim 13, wherein the substantially dispersionless retarder material comprises one of cyclic-olefin-copolymer (COC) and polycarbonate.

15. The polarization modulator of claim 1, further comprising a quarter wave retarder on the light path following the polarization wheel, the quarter wave retarder being oriented at +45 degrees with respect to the state of polarization emanating from the first circular arc, and oriented at −45 degrees with respect to the state of polarization emanating from the second circular arc.

16. The polarization modulator of claim 1, wherein the retarder stack filter comprises a Finite Infinite Response (FIR) filter, and is operable to generate at least N+1 spatially offset light pulses in response to a linearly polarized light impulse input.

17. The polarization modulator of claim 1, wherein the polarization wheel further comprises an antireflective coating.

18. A stereoscopic projection system, comprising:
a projector subsystem; and
a polarization modulator subsystem,
the polarization modulator subsystem being operable to temporally modulate projected images from the projector subsystem into orthogonal polarization states,
wherein the polarization modulator subsystem comprises:
a polarization wheel having a first circular arc and a second circular arc, wherein the first circular arc comprises a first multi-layer retarder stack filter having a first plurality of linear retarders, and wherein the second circular arc comprises a second multi-layer retarder stack filter having a first plurality of linear retarders.

19. The stereoscopic projection system of claim 18, further comprising a controller adapted to control the position of the polarization wheel in synchronization with the projected images from the projector subsystem.

20. The stereoscopic projection system of claim 18, wherein a linear polarizer is located in a light path between the projector subsystem and the polarization modulator subsystem.

21. The stereoscopic projection system of claim 18:
wherein the first retarder stack filter is a θ degree polarization state rotator, and
wherein the second retarder stack filter is a (θ−90) degree polarization state rotator.

22. The stereoscopic projection system of claim 21:
wherein the first retarder stack filter is a +45 degree polarization state rotator, and
wherein the second retarder stack filter is a −45 degree polarization state rotator.

23. The stereoscopic projection system of claim 18, wherein a projection lens is located in a light path after the polarization wheel.

24. The stereoscopic projection system of claim 18, wherein a projection lens is located in a light path between the projection subsystem and the polarization modulation subsystem.

25. The stereoscopic projection system of claim 18, further comprising a quarter wave retarder on the light path following the polarization wheel, the quarter wave retarder being oriented at +45 degrees with respect to the state of polarization emanating from the first circular arc, and oriented at −45 degrees with respect to the state of polarization emanating from the second circular arc.

26. The polarization modulator of claim 18, wherein the first retarder stack filter comprises a Finite Infinite Response (FIR) filter, and is operable to generate at least N+1 spatially offset light pulses in response to the linearly polarized light impulse input.

* * * * *